US011381932B2

(12) United States Patent
Ikeda et al.

(10) Patent No.: US 11,381,932 B2
(45) Date of Patent: *Jul. 5, 2022

(54) GUIDANCE INFORMATION PROVIDING SYSTEM, GUIDANCE INFORMATION PROVIDING DEVICE, GUIDANCE INFORMATION PROVIDING METHOD, AND PROGRAM-STORED NON-TRANSITORY STORAGE MEDIUM

(71) Applicant: Toyota Jidosha Kabushiki Kaisha, Toyota (JP)

(72) Inventors: Michio Ikeda, Nagoya (JP); Eiichi Ishii, Nisshin (JP); Mitsugu Makita, Nagoya (JP); Toru Yoshida, Miyoshi (JP); Gaku Itou, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,106

(22) Filed: Feb. 22, 2021

(65) Prior Publication Data

US 2021/0185480 A1 Jun. 17, 2021

Related U.S. Application Data

(63) Continuation of application No. 16/225,162, filed on Dec. 19, 2018, now Pat. No. 10,966,054.

(30) Foreign Application Priority Data

Dec. 27, 2017 (JP) .............................. JP2017-251640

(51) Int. Cl.
*G08G 1/123* (2006.01)
*H04W 4/024* (2018.01)
(Continued)

(52) U.S. Cl.
CPC ............ *H04W 4/024* (2018.02); *G06Q 30/06* (2013.01); *G06Q 30/0639* (2013.01);
(Continued)

(58) Field of Classification Search
CPC ..... G06Q 30/06; G06Q 30/0639; H04W 4/02; H04W 4/024; H04W 4/029; H04W 4/35; H04W 4/44
(Continued)

(56) References Cited

U.S. PATENT DOCUMENTS

2010/0080163 A1* 4/2010 Krishnamoorthi .. H04W 72/005
340/568.1
2011/0313811 A1* 12/2011 Urban ................... G06Q 20/203
296/24.3

(Continued)

FOREIGN PATENT DOCUMENTS

JP 2002-008196 A 1/2002
JP 2002-150497 A 5/2002
(Continued)

OTHER PUBLICATIONS

U.S. Appl. No. 16/225,162, filed Dec. 19, 2018, Michio Ikeda et al.

*Primary Examiner* — Naomi J Small
(74) *Attorney, Agent, or Firm* — Dinsmore & Shohl LLP

(57) ABSTRACT

A guidance information providing system includes a plurality of mobile shop vehicles and a server device. Each mobile shop vehicle of the mobile shop vehicles includes first circuitry and the server device includes second circuitry. The first circuitry is configured to acquire location information on the mobile shop vehicle and configured to send the location information on the mobile shop vehicle. The second circuitry is configured to acquire location information on the mobile shop vehicle, configured to generate map information indicating a layout of the plurality of mobile shop vehicles, and configured to output the map information.

20 Claims, 7 Drawing Sheets

(51) Int. Cl.
*H04W 4/029* (2018.01)
*H04W 4/35* (2018.01)
*H04W 4/44* (2018.01)
*G06Q 30/06* (2012.01)
*H04W 4/02* (2018.01)

(52) U.S. Cl.
CPC ............. *H04W 4/02* (2013.01); *H04W 4/029* (2018.02); *H04W 4/35* (2018.02); *H04W 4/44* (2018.02)

(58) Field of Classification Search
USPC ........................................................ 340/990
See application file for complete search history.

(56) References Cited

U.S. PATENT DOCUMENTS

| | | | | |
|---|---|---|---|---|
| 2012/0059729 | A1* | 3/2012 | Roa | G06Q 30/0601 |
| | | | | 705/26.1 |
| 2013/0027227 | A1* | 1/2013 | Nordstrom | G01C 21/3438 |
| | | | | 340/990 |
| 2014/0085400 | A1* | 3/2014 | Kaus | G06Q 10/02 |
| | | | | 348/14.03 |
| 2014/0372420 | A1* | 12/2014 | Slep | G06F 16/9537 |
| | | | | 707/724 |
| 2016/0005037 | A1* | 1/2016 | Eilertsen | G06Q 20/405 |
| | | | | 705/44 |
| 2016/0265919 | A1 | 9/2016 | Schuller et al. | |
| 2017/0075355 | A1 | 3/2017 | Micks et al. | |
| 2017/0193073 | A1* | 7/2017 | Tannen | H04L 67/02 |
| 2017/0206593 | A1 | 7/2017 | Zolotov | |
| 2017/0332200 | A1* | 11/2017 | Kaiman | H04W 4/14 |
| 2018/0211427 | A1* | 7/2018 | Andrew | G06T 11/00 |

FOREIGN PATENT DOCUMENTS

| | | |
|---|---|---|
| JP | 2003-122991 A | 4/2003 |
| JP | 2008-123278 A | 5/2008 |
| JP | 2010-143558 A | 7/2010 |
| JP | 2012-230523 A | 11/2012 |
| JP | 2015-019640 A | 2/2015 |
| KR | 101703737 B1 | 2/2017 |

* cited by examiner

GUIDANCE INFORMATION PROVIDING SYSTEM, GUIDANCE INFORMATION PROVIDING DEVICE, GUIDANCE INFORMATION PROVIDING METHOD, AND PROGRAM-STORED NON-TRANSITORY STORAGE MEDIUM

CROSS-REFERENCE TO RELATED APPLICATIONS

This application is a continuation of U.S. patent application Ser. No. 16/225,162 filed on Dec. 19, 2018 which claims priority to Japanese Patent Application No. 2017-251640 filed on Dec. 27, 2017, the entire contents of which are herein incorporated by reference.

BACKGROUND

1. Technical Field

The present disclosure relates to a guidance information providing system, a guidance information providing device, a guidance information providing method for providing guidance information on a plurality of mobile shops, and a program-stored non-transitory storage medium.

2. Description of Related Art

A vehicle for use as a mobile shop or an exhibition site is proposed (Japanese Patent Application Publication No. 2010-143558 (JP 2010-143558 A)). It is assumed that a shopping mall is created by collecting a plurality of such mobile shop vehicles in an open space.

Since such a shopping mall is composed of mobile shop vehicles, it is possible to flexibly change the layout of the shops.

SUMMARY

Although the layout of the shops may be changed flexibly in such a shopping mall, it is difficult for the user to know what shops are located at which locations. It also takes time and effort to create the latest shop guidance information.

The present disclosure provides the technology that makes it possible for the user to easily understand the layout of a plurality of shops in a shopping mall composed of a plurality of mobile shop vehicles.

A first aspect of the present disclosure is a guidance information providing system. The guidance information providing system includes a plurality of mobile shop vehicles each including first circuitry and a server device including second circuitry. The first circuitry is configured to acquire location information on a mobile shop vehicle and is configured to send the location information on the mobile shop vehicle. The mobile shop vehicle is included in the plurality of mobile shop vehicles and includes the first circuitry. The second circuitry is configured to acquire location information on the plurality of mobile shop vehicles, is configured to generate map information indicating a layout of the plurality of mobile shop vehicles, and is configured to output the map information.

In the first aspect described above, the first circuitry may be configured to send shop information wherein the shop information includes at least one of a name and a type of a shop of the mobile shop vehicle. The second circuitry may be configured to acquire the shop information and may be configured to generate map information wherein the map information indicates the layout of the plurality of mobile shop vehicles and at least one of names and types of the plurality of shops. The plurality of shops includes the shop.

In the first aspect described above, the first circuitry may be configured to send an identifier of the mobile shop vehicle. The second circuitry may be configured to acquire shop information wherein the shop information includes at least one of a name and a type of a shop of the mobile shop vehicle associated with the identifier of the mobile shop vehicle and may be configured to generate map information wherein the map information indicates the layout of the plurality of mobile shop vehicles and at least one of names and types of the plurality of shops. The plurality of shops includes the shop.

In the first aspect described above, the shop information may include at least one of inventory information on goods, selling price information, and opening hours information.

In the first aspect described above, the shop information may include information on a future movement of the mobile shop vehicle. The second circuitry may be configured to generate map information indicating a future layout of the plurality of mobile shop vehicles based on the information on the future movement of the shop included in the shop information.

In the first aspect described above, the first circuitry may be configured to periodically send the location information on the mobile shop vehicle to an external server with the location information on the mobile shop vehicle associated with an identifier of the mobile shop vehicle. The second circuitry may be configured to acquire from the external server the location information on the mobile shop vehicle with which the identifier of the mobile shop vehicle is associated.

In the first aspect described above, the location information on the mobile shop vehicle may include latitude and longitude information obtained from a positioning device provided on the mobile shop vehicle.

In the first aspect described above, the location information on the mobile shop vehicle may include information indicating a location relative to surrounding objects wherein the information is obtained from at least one of a camera and a sensor provided on the mobile shop vehicle.

In the first aspect described above, the second circuitry may be configured to output the map information to an image display device.

In the first aspect described above, the second circuitry may be configured to output the map information to a mobile terminal of a user.

In the first aspect described above, the second circuitry may be configured to output the map information to the mobile shop vehicle. The first circuitry may be configured to receive the map information and to output the map information to the mobile terminal of the user.

In the first aspect described above, the first circuitry may be configured to send not only the location information on the mobile shop vehicle but also direction information indicating the direction in which the mobile shop vehicle is oriented.

According to the configuration described above, the second circuitry also uses the direction information on the mobile shop vehicle sent by the first circuitry. This makes it possible to generate map information indicating an accurate layout that also shows the directions of the mobile shop vehicles.

In the first aspect described above, the second circuitry may be configured to output the map information generated by the second circuitry. The map information may be output to any destination such as a device for displaying map information or a device for relaying map information to another device. For example, the second circuitry may be configured to output the map information to an image display device. Furthermore, the second circuitry may be configured to output the map information to a mobile terminal of a user (user terminal). The second circuitry may be configured to output the map information to the mobile shop vehicle. The image display device, the user terminal, or the mobile shop vehicle that has received the map information may display the map information on its own display or may relay the map information to another device.

According to the configuration described above, it is possible to generate real-time, accurate map information on a shopping mall composed of a plurality of mobile shop vehicles. In addition, this configuration allows the map information to be generated automatically, eliminating human labor.

In the first aspect described above, the shop information may include information on a future movement of the mobile shop vehicle. The information on the future movement may include information by which it is possible to know where the shop will be opened. An example of information on the future movement may be planned route information that represents a future planned route. The planned route information may be a result of a route search that is performed by specifying a movement time or may be a future movement command when the vehicle is an autonomous driving vehicle. Furthermore, the information on a future movement may be information including at least one of the time of starting from the current location and the time of arrival at the destination.

According to the configuration described above, the second circuitry of the server device may use the information described above to generate map information indicating the future layout of the plurality of mobile shop vehicles A second aspect of the present disclosure is a guidance information providing device. The guidance information providing device includes circuitry. The circuitry is configured to acquire location information on a mobile shop vehicle, is configured to generate map information indicating a layout of the plurality of mobile shop vehicles, and is configured to output the map information. The plurality of mobile shop vehicles includes the mobile shop vehicle.

In the second aspect described above, the circuitry may be configured to acquire shop information wherein the shop information includes at least one of a name and a type of a shop of the mobile shop vehicle and may be configured to generate map information wherein the map information indicates the layout of the plurality of mobile shop vehicles and at least one of names and types of a plurality of shops. The plurality of shops includes the shop.

In the second aspect described above, the shop information may include additional information that includes at least one of inventory information on goods, selling price information, and opening hours information and the circuitry may be configured to output the additional information with the additional information associated with the map information.

In the second aspect described above, the shop information may include information on a future movement of the shop and the circuitry may be configured to generate map information indicating a future layout of the plurality of mobile shop vehicles based on the information on the future movement of the mobile shop vehicle included in the shop information.

In the second aspect described above, the circuitry may be configured to acquire an identifier of the mobile shop vehicle from the mobile shop vehicle and may be configured to acquire location information associated with the identifier from an external server in which the location information sent from the mobile shop vehicle is stored.

In the second aspect described above, the location information includes latitude and longitude information obtained from a positioning device provided on the mobile shop vehicle.

In the second aspect described above, the location information may include information indicating a location relative to surrounding objects wherein the information is obtained from at least one of a camera and a sensor provided on the mobile shop vehicle.

A third aspect of the present disclosure is a guidance information providing method. The guidance information providing method includes acquiring, by a computer, location information on a mobile shop vehicle, generating, by the computer, map information indicating a layout of the plurality of mobile shop vehicles, and outputting, by the computer, the map information. The plurality of mobile shop vehicles includes the mobile shop vehicle.

A non-transitory storage medium storing a program, wherein the program, when executed by the computer, causes the computer to execute the third aspect.

According to the first aspect, second aspect, and third aspect of the present disclosure, a user can easily understand the layout of the plurality of shops in a shopping mall composed of a plurality of mobile shop vehicles.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

System Outline

Figure 1:
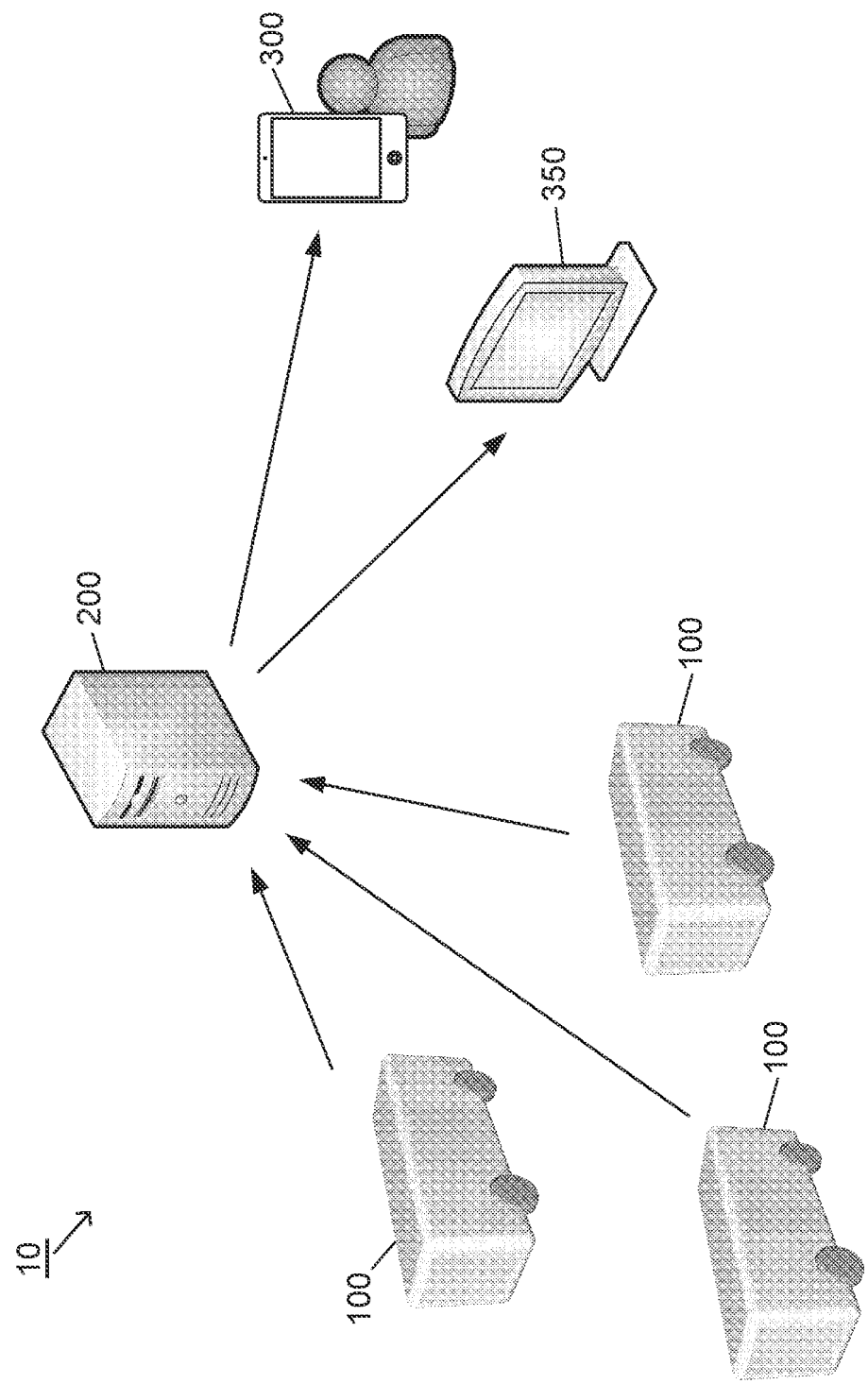
FIG. 1 is a system outline diagram of a shop guidance information providing system according to a first embodiment.

This embodiment relates to a shop guidance information providing system for a shopping mall (compound commercial facility) created by collecting a plurality of mobile shop vehicles. A shop guidance information providing system 10 according to this embodiment will be described below with reference to FIG. 1. The shop guidance information providing system 10 according to this embodiment includes a plurality of mobile shop vehicles 100, a server device 200, a user terminal 300, and an output device 350.

The mobile shop vehicle 100 is a multipurpose movable body having a function that varies from vehicle to vehicle. In this embodiment, the mobile shop vehicle 100 is a vehicle that can move on a road. The mobile shop vehicle 100 has in its interior the facilities and equipment for shop sales so that, after traveling to the destination, sales activity can be performed using the facilities and equipment. In this disclosure, a "shop" means the facilities for providing products (goods) or services for a fee or free of charge.

In this embodiment, it is assumed that a plurality of mobile shop vehicles 100 are collected in an open space to function as a shopping mall. Since the mobile shop vehicles 100 are collected to create a shopping mall, the shopping mall in this embodiment can be easily created in a place and area where there is no shop. Note that the mobile shop vehicles 100 may be collected on a street and that the shops constituting a shopping mall may include shops other than mobile shop vehicles (non-vehicle mobile shops and non-mobile shops).

A shopping mall composed of the mobile shop vehicles 100 is characterized in that it is easy to change the layout of the mobile shop vehicles 100. Therefore, it is possible to change the layout of the mobile shop vehicles 100 in the shopping mall or to change the participating mobile shop vehicles 100 depending on the date and the time zone. Such a change in the layout is preferable from the viewpoint that users can visit more shops and that the sales volume is increased.

However, a change in the layout of the mobile shop vehicles 100 makes it difficult to know what shops are located at which locations. To address this problem, the shop guidance information providing system 10 according to this embodiment is configured to provide the user with guidance information including the information on the shop layout in a shopping mall.

More specifically, the mobile shop vehicle 100 sends the location information and the shop information to the server device 200 and, based on the received information, the server device 200 generates a shop guidance map. The server device 200 provides the generated shop guidance map to the user terminal 300 carried by the user and to the output device (display) 350 installed in the shopping mall. The user views the shop guidance map on the terminal 300 or on the display 350 to know what shops are located at which locations. In addition, the shop information included in the shop guidance map, such as the bargain sales information and the business hours information, allows the user to easily obtain the information.

System Configuration

Figure 2:
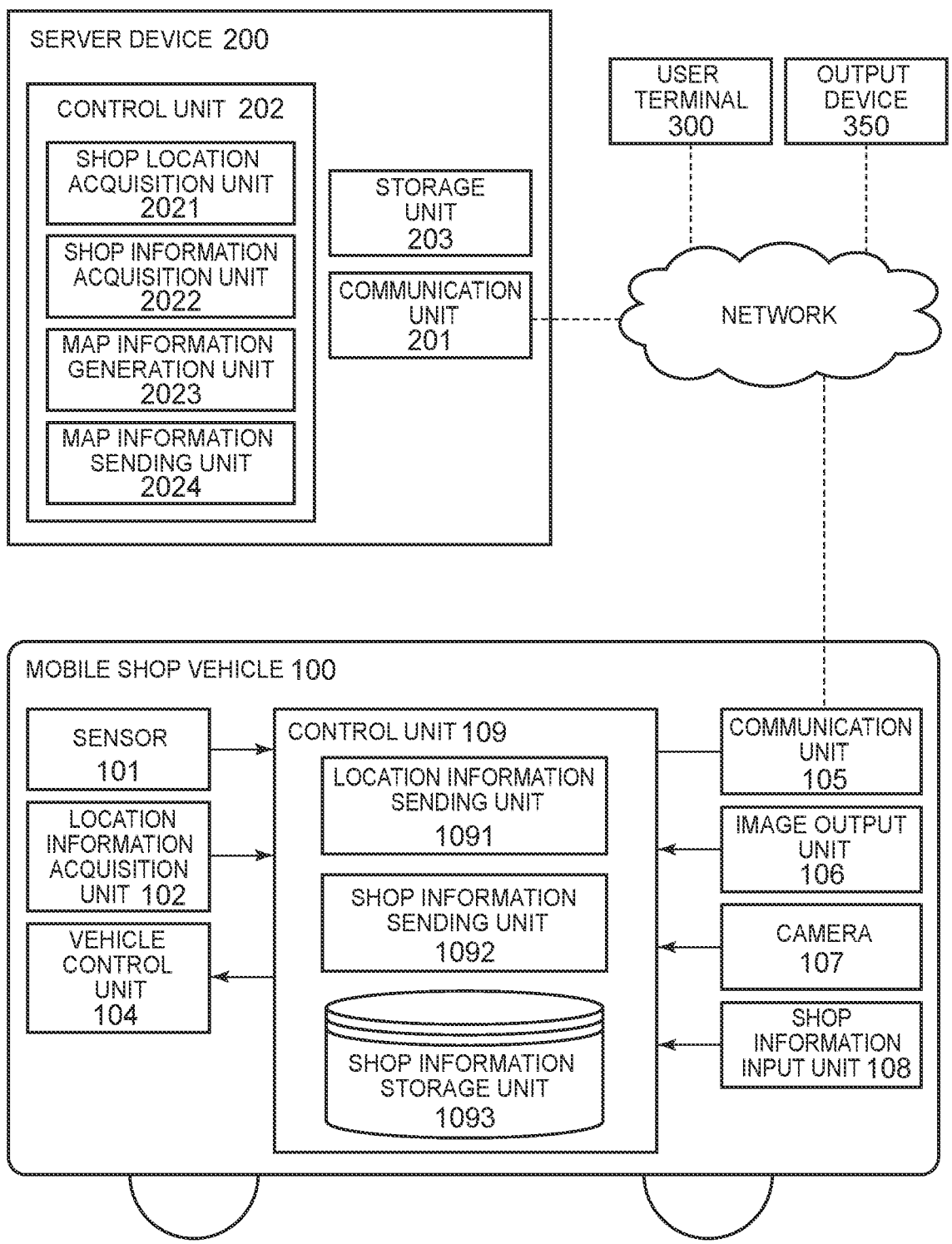
FIG. 2 is a functional block diagram of the shop guidance information providing system according to the first embodiment.

The components of the system will be described below in detail. FIG. 2 is a block diagram schematically showing an example of the configuration of the mobile shop vehicle 100 and the server device 200 shown in FIG. 1.

Mobile Shop Vehicle

In this specification, the description of the equipment for shop sales, which is provided in the interior of the mobile shop vehicle 100, is omitted. The mobile shop vehicle 100 will be described below with particular emphasis on the vehicle function common to a plurality of mobile shop vehicles 100 and on the function for providing shop guidance information.

The mobile shop vehicle 100 includes a sensor 101, a location information acquisition unit 102, a vehicle control unit 104, a communication unit 105, an image output unit 106, a camera 107, a shop information input unit 108, and a control unit 109. The mobile shop vehicle 100, which may be a gasoline vehicle, a diesel vehicle, or an electric vehicle, operates on the internal combustion engine or on electric power supplied from a battery.

The sensor 101 is a unit for sensing the state of the vehicle and for sensing the surroundings of the vehicle. The sensor 101 for sensing the state of the vehicle includes an acceleration sensor, a speed sensor, and a direction sensor. The sensor 101 for sensing the surroundings of the vehicle includes a stereo camera, a laser scanner, an LIDAR, and a radar. The information acquired by the sensor 101 is sent to the control unit 103.

The location information acquisition unit 102 is a unit for acquiring the current location of the vehicle. Typically, the location information acquisition unit 102 is a global positioning system (GPS) device for receiving the GPS satellite signals to obtain the location information. The location information obtained from the GPS device represents the latitude, longitude, and altitude. The location information acquisition unit 102 may be any positioning device that can obtain the current location of the vehicle. For example, the location information acquisition unit 102 may be a positioning device using the global navigation satellite system (GNSS) other than the GPS or a positioning device based on base station positioning.

The vehicle control unit 104 controls the vehicle function of the mobile shop vehicle 100. The vehicle control unit 104 is configured to include, for example, an engine or a motor, an inverter, brakes, a steering wheel, and an electronic control unit (ECU) for controlling these components.

The communication unit 105 is a communication unit for connecting the mobile shop vehicle 100 to the network. In this embodiment, the mobile shop vehicle 100 can communicate with another device (e.g., the server device 200) via a network using the 3G-based or LTE-based mobile communication service. Note that the communication unit 105 may be provided with a communication unit for performing vehicle-to-vehicle communication with another mobile shop vehicle 100.

The image output unit 106 is a unit for outputting an image to an exterior display provided on the vehicle body. The mobile shop vehicle 100 in this embodiment has a display outside the vehicle body for displaying any images thereon. The exterior display may be a liquid crystal display, an organic EL display, or an LED matrix panel.

The camera 107 is a camera provided on the body of the mobile shop vehicle 100. In this embodiment, the mobile shop vehicle 100 has the camera 107 mounted on the vehicle to acquire images (still images or moving images). Any number (one or more cameras) of cameras may be used. A plurality of cameras may also be installed so that the images of the front, back, and sides (left and right) can be captured.

The shop information input unit 108 is a unit for inputting shop information about the mobile shop vehicle 100. The shop information input unit 108 may receive shop information from a user via a keyboard, a touch panel, or a microphone (voice input unit). In addition, the shop information input unit 108 may acquire shop information through communication with another device via the communication unit 105.

The shop information includes the following information on the shop: shop name, type (genre), appearance, contact address, business hours, goods and services for sale, inventory information on goods, selling price information, bargain sale information, opening hours information, vehicle (shop) size, and congestion situation. One or more of these items are input via the shop information input unit 108. The shop information may include an identifier (ID) for identifying the shop. The shop identifier may be the same as the vehicle identifier, or it may be associated with the vehicle identifier.

The control unit 109 is a computer that controls the mobile shop vehicle 100 in its entirety. For example, the control unit 109 includes a microprocessor and a memory that stores programs therein. By executing a program by the microprocessor, the control unit 109 functions as a location information sending unit 1091, a shop information sending unit 1092, or a shop information storage unit 1093. A part or all of these functions may be implemented by logic circuits such as an application specific integrated circuit (ASIC) and a field programmable gate array (FPGA).

The location information sending unit 1091 sends the location information, acquired from the location information acquisition unit 102, to the server device 200 via the communication unit 105. The location information sending unit 1091 may send the location information at any time. For example, the location information sending unit 1091 may send the location information periodically or at the time the shop information is sent. In this embodiment, the location information sending unit 1091 sends not only the location information on the mobile shop vehicle 100 but also the direction information indicating the direction in which the mobile shop vehicle 100 is oriented.

The shop information sending unit 1092 sends the shop information, stored in the shop information storage unit 1093, to the server device 200 via the communication unit 105. The shop information sending unit 1092 may send the shop information at any time. For example, the shop information sending unit 1092 may send the shop information each time new shop information is received from the user, may send it periodically, or may send the it at a time specified by the user. When the shop information storage unit 1093 includes a plurality of pieces of shop information, the shop information sending unit 1092 may send any one of them. For example, the shop information sending unit 1092 may send the latest shop information, the shop information specified by the user, or all the shop information.

The location information and the shop information are sent with the shop identifier associated with them. Also, the location information and the shop information may be sent to the server device 200 as separate messages, or may be sent together to the server device 200 in one message. The shop information and the location information, when sent as separate messages, do not need to be sent to the server device 200 on the same communication path. These messages may be sent to the server device 200 via any communication path as long as they eventually arrive at the server device 200.

The shop information storage unit 1093 stores the information regarding the shop of the mobile shop vehicle 100. For example, the shop information storage unit 1093 includes the following shop information: shop name, type (genre), appearance, contact address, business hours, goods and services for sale, inventory information on goods, selling price information, bargain sale information, opening hours information, vehicle (shop) size, and congestion situation. The shop information may include an identifier (ID) for identifying the shop.

Server Device

Next, the server device 200 will be described. The server device 200 acquires the location information and the shop information from a plurality of mobile shop vehicles 100, generates the shop guidance information, and provides the generated shop guidance information to the user terminal 300 and the output device 350. The server device 200 may be regarded as a guidance information generating device for generating guidance information on a plurality of mobile shop vehicles 100 or as a guidance information providing device for providing the guidance information.

The server device 200 includes a communication unit 201, a control unit 202, and a storage unit 203.

The communication unit 201 is a communication interface, similar to the communication unit 105, for communicating with the mobile shop vehicle 100 via a network.

The control unit 202 is a unit for controlling the server device 200. For example, the control unit 202 includes a microprocessor and a memory that stores programs therein. By executing a program by the microprocessor, the control unit 202 functions as a shop location acquisition unit 2021, a shop information acquisition unit 2022, a map information generation unit 2023, or a map information sending unit 2024. A part or all of these functions may be implemented by logic circuits such as ASIC and FPGA.

The shop location acquisition unit 2021 acquires the location information and the direction information sent by the location information sending unit 1091 of the mobile shop vehicle 100. The location information and the direction information, acquired by the shop location acquisition unit 2021, are stored in the storage unit 203 with the shop identifier associated with them.

The shop information acquisition unit 2022 acquires the shop information sent by the shop information sending unit 1092 of the mobile shop vehicle 100. The shop information, acquired by the shop information acquisition unit 2022, is stored in the storage unit 203 with the shop identifier associated with it.

The map information generation unit 2023 generates a shop guidance map (map information), which indicates the layout of the mobile shop vehicles 100, from the location information and the direction information on a plurality of mobile shop vehicles 100 stored in the storage unit 203. Since not only the location information, but also the direction information, on the mobile shop vehicles 100 is available for use, the map information generation unit 2023 can generate a guidance map that takes into consideration not only the location but also the direction of the mobile shop vehicles 100. The map information generation unit 2023 may generate the map information at any time. For example, the map information generation unit 2023 may generate the map information at regular intervals, each time when new shop information or location information is acquired, or at a time at which the generated guidance map is changed by an amount equal to or larger than a predetermined amount.

The shop guidance map may include not only the layout of the mobile shop vehicles 100 but also the other information such as the shop information. The shop guidance map is generated in such a manner that at least the shop names of the mobile shop vehicles 100 or the types (genres) of the shops can be identified. For example, in the shop guidance map, a shop name is displayed superimposed on a shop display or a shop display is shown in appearance (typically, color) according to the type of the shop.

In addition, the shop guidance map may include additional information such as the product inventory information, selling price information, bargain sale information, and opening hours information, or may be linked to the additional information. For example, the map information generation unit 2023 may generate a shop guidance map in which the additional information is displayed or may be displayed. The map information generation unit 2023 may also output a shop guidance map in which the additional information is linked. An example of this link, the shop guidance map includes the information (for example, a hyperlink) indicating the information source for providing the additional information.

The map information sending unit 2024 sends the shop guidance map, generated by the map information generation unit 2023, to the user terminal 300 and the output device 350. The user terminal 300 and the output device 350 display the received shop guidance map. The map information sending unit 2024 may send the shop guidance map any time. For example, the map information sending unit 2024 may send the shop guidance map to the user terminal 300 when a request is received from the user, and to the output device 350 when a new shop guidance map is generated.

The storage unit 203 is a unit for storing information. The storage unit 203 is configured by a storage medium such as a RAM, a magnetic disk, a semiconductor memory, or so on.

User Terminal and Output Device

The user terminal 300 is a portable terminal (mobile computer) carried by a user such as a smartphone terminal or a wearable computer. The output device 350 is a display (image display device) installed outdoors or indoors, such as a digital signage or a kiosk terminal. The output device 350 may include an input unit that accepts an input from the user.

The user terminal 300 and the output device 350 display the shop guidance map, sent from the server device 200, on the display. In addition, the user terminal 300 and the output device 350 receive a processing instruction on the shop guidance map from the input unit (e.g., touch panel) and, in response to the processing instruction, present the information, associated with the shop guidance map, to the user.

Processing

Figure 3:
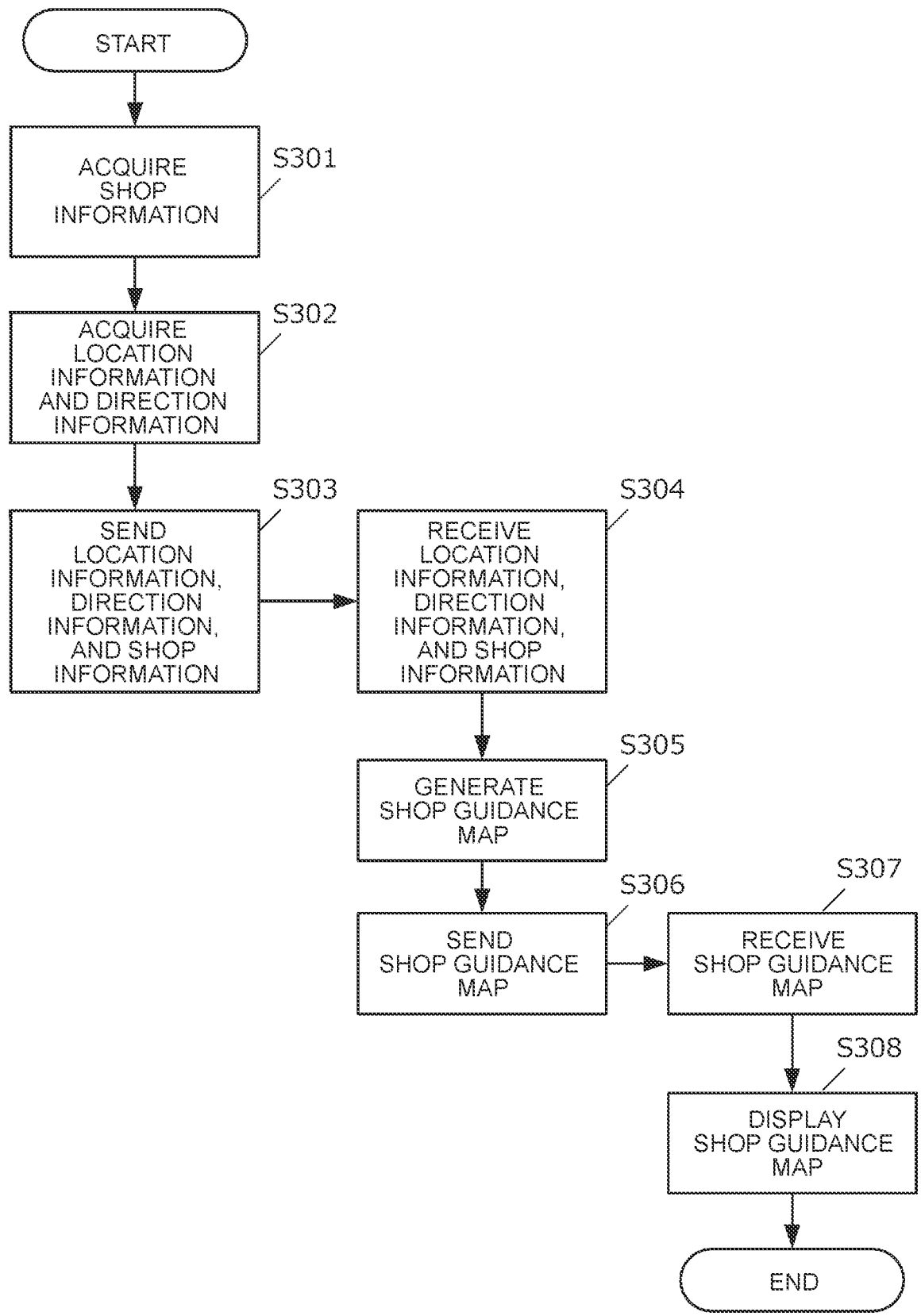
FIG. 3 is a diagram showing a flow of processing in the shop guidance information providing system according to the first embodiment.

Next, the processing performed by each of the above-described components will be described. FIG. 3 is a flowchart showing a flow of processing in which the server device 200 generates the shop guidance information on a shopping mall, composed of the mobile shop vehicles 100, and outputs the generated shop guidance map to the user terminal 300 and the output device 350. The processing shown in FIG. 3 is executed each time the mobile shop vehicle 100 sends shop information to the server device 200.

The processing shown in the flowchart in FIG. 3 is merely an example. The shop guidance information may be generated and output also by processing different from the processing shown in this flowchart.

First, in step S301, the control unit 109 of the mobile shop vehicle 100 acquires the shop information received from the shop information input unit 108. The shop information acquired in this step is not only the shop information received from the shop information input unit 108 but also the shop information stored in the shop information storage unit 1093. For example, the control unit 109 may acquire the basic information on the shop, such as the shop name, type, business hours, goods and services for sale, and vehicle (shop) size, from the shop information storage unit 1093.

In step S302, the control unit 109 of the mobile shop vehicle 100 acquires the location information on the mobile shop vehicle 100 from the location information acquisition unit 102. At this time, the control unit 109 also acquires direction information, which indicates the direction in which the mobile shop vehicle 100 is oriented, from the sensor 101 (direction sensor).

In step S303, the location information sending unit 1091 sends the location information and the direction information, and the shop information sending unit 1092 sends the shop information, to the server device 200 via the communication unit 105. The location information and the shop information are sent with the identifier of the mobile shop vehicle 100 associated with them.

In step S304, the shop location acquisition unit 2021 and the shop information acquisition unit 2022 of the server device 200 acquire the location information, direction information, and shop information on the mobile shop vehicle 100 via the communication unit 201.

In step S305, the map information generation unit 2023 generates a shop guidance map, which indicates the layout of the mobile shop vehicles 100, from the location information, direction information, vehicle size information on the plurality of mobile shop vehicles 100. Since not only the locations but also the directions of the mobile shop vehicles 100 are available for use, the map information generation unit 2023 can generate a guidance map reflecting the directions of the mobile shop vehicles.

The guidance map may be generated in such a way that the guidance map provides the name of a shop and the type of a shop. For example, the shop name may be displayed superimposed on each mobile shop vehicle 100 on the map. In addition, each mobile shop vehicle 100 on the map may be displayed in appearance (for example, color) corresponding to the type of shop.

In addition, the map information generation unit 2023 generates a shop guidance map so that the shop information on each shop on the shop guidance map can be displayed.

In step S306, the map information sending unit 2024 sends the generated shop guidance map to the user terminal 300 and the output device 350 via the communication unit 201. In step S307, the user terminal 300 and the output device 350 receive the shop guidance map and, in step S308, displays the shop guidance map on the display.

Example of Shop Guidance Map

Figure 4A:
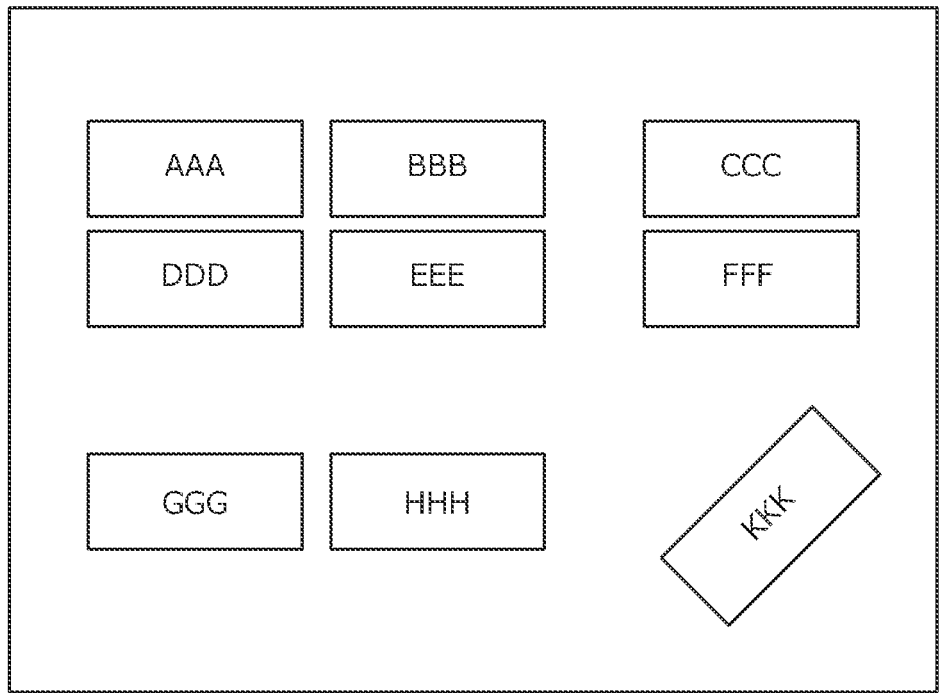
FIG. 4A is a diagram showing an example of a displayed shop guidance map.

FIG. 4A is a diagram showing an example of a shop guidance map generated by the map information generation unit 2023. The shop guidance map shown in FIG. 4A is a map that provides a graphical layout of nine mobile shop vehicles 100.

A shop name ("AAA" etc.) may be displayed superimposed on each mobile shop vehicle 100 in the map. Instead of being displayed superimposed on the mobile shop vehicle 100, the shop names may be displayed together outside the map. In addition, each mobile shop vehicle 100 in the map may be displayed with an appearance corresponding to the type of shop. For example, red may be used for a restaurant with a dining area, yellow for a restaurant for take-out only, blue for a fashion shop, and green for amusement facilities such as a movie theater and a karaoke bar.

Figure 4B:
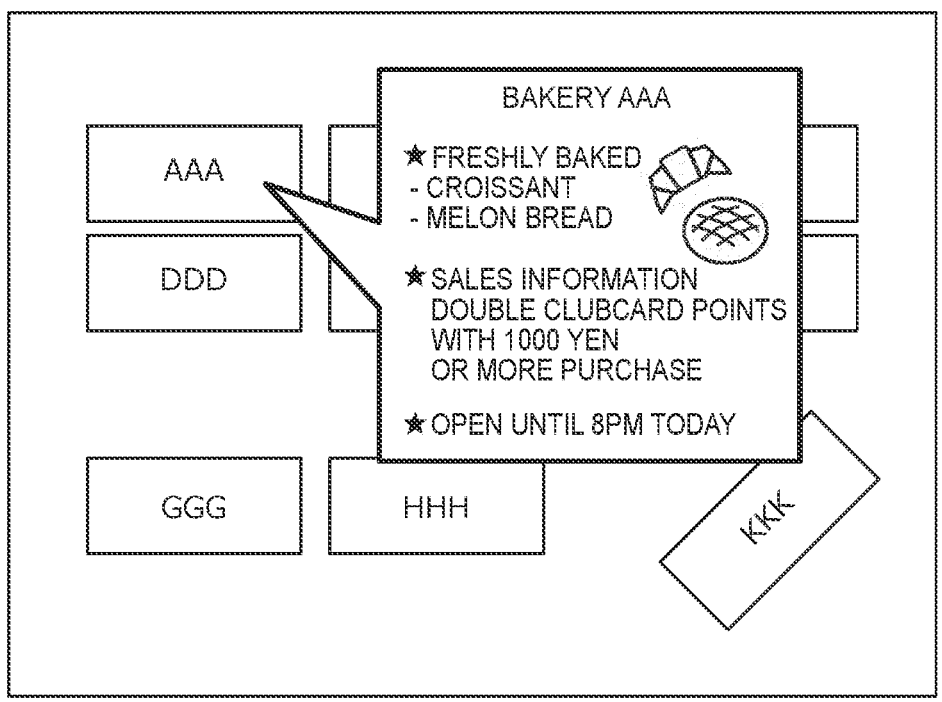
FIG. 4B is a diagram showing an example of a displayed shop guidance map.

In addition, the map information generation unit 2023 generates a shop guidance map so that the shop information on each shop shown on the shop guidance map can be displayed. For example, the map information generation unit 2023 generates a shop guidance map so that, by specifying (tapping or clicking) a shop on the shop guidance map, the user can display the shop information on the shop. FIG. 4B shows an example of shop information displayed when shop "AAA" is specified. In this example, the name of the shop ("bakery AAA"), the information on goods (guidance on freshly baked bread), bargain sale information (point boost campaign information), and business hours information are presented.

The shop guidance map described here is merely an example. The shop layout presentation method, the shop information content to be displayed, and the shop information presentation method may be changed as appropriate.

Advantageous Effects of This Embodiment

According to this embodiment, the shop guidance map of a shopping mall composed of a plurality of mobile shop vehicles 100 can be presented to the user terminal 300 and the output device 350. This allows the user to easily know what shops are located at which locations.

The processing that the staff of the mobile shop vehicle 100 needs to do when generating a shop guidance map is only the input of shop guidance information, meaning that the load for generating the shop guidance map is not high. Furthermore, the input of shop guidance information, if scheduled in advance, allows a shop guidance map to be generated and sent without manual intervention.

Modification

In the above example, all the shop information is sent from the mobile shop vehicle 100 to the server device 200. However, some or all of the shop information may also be sent from a device other than the mobile shop vehicle 100 to the server device 200.

For example, the basic information, such as the name and type of the shop and the business guidance information, may be sent from another computer to the server device 200 for registration. The server device 200 stores the shop information in the shop information storage unit 1093 with the shop identifier associated with it. The shop information acquisition unit 2022 of the server device 200 acquires the shop information, necessary for generating the shop guidance map, from the shop information storage unit 1093 with the shop identifier as the key.

Note that the shop information described above may be stored in an external device other than the server device 200. In this case, the shop information acquisition unit 2022 of the server device 200 obtains the shop information on the mobile shop vehicle 100 from the external device with the shop identifier as the key.

Second Embodiment

In the first embodiment, the location information and the direction information on the mobile shop vehicle 100 are sent directly from the mobile shop vehicle 100 to the server device 200. In a second embodiment, the location information and the direction information on the mobile shop vehicle 100 are sent from the mobile shop vehicle 100 to the server device 200 via a vehicle information server (external server) 400.

Figure 5:
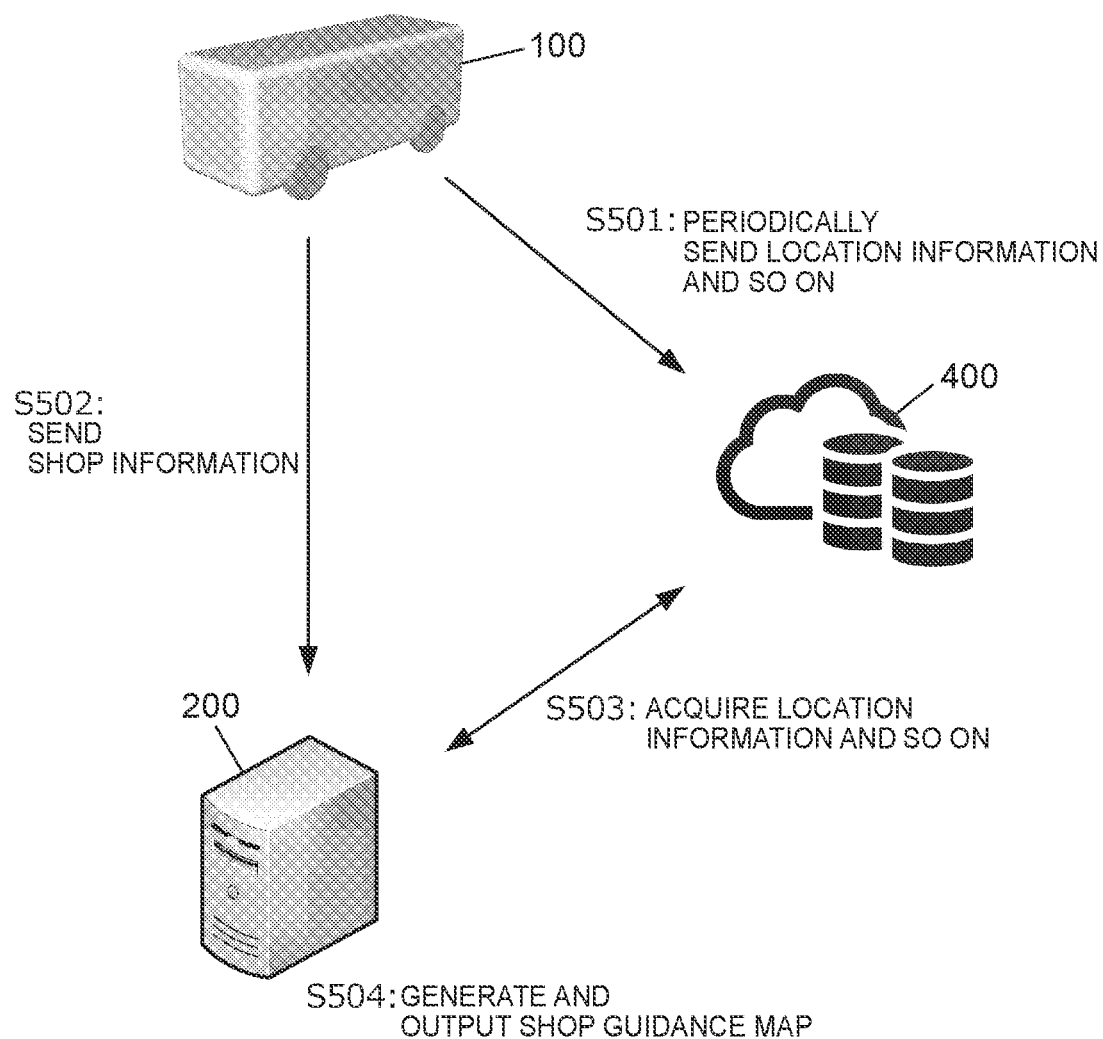
FIG. 5 is a diagram showing a configuration and a processing outline of a shop guidance information providing system according to a second embodiment.

FIG. 5 is a diagram showing a configuration and a processing outline of a shop guidance information providing system according to this embodiment. As shown in FIG. 5, a shop guidance information providing system according to this embodiment includes the mobile shop vehicle 100, the server device 200, and the vehicle information server 400. The vehicle information server 400 is configured to collect the information, such as the location and speed of the vehicle and the traveling situation, through the telematics service in real time.

In this embodiment, the control unit 109 of the mobile shop vehicle 100 sends the information on the state of the vehicle periodically (for example, at intervals of 5 minutes) to the vehicle information server 400 (S501). The information that is sent includes the location information and the direction information on the mobile shop vehicle 100. The information that is sent may also include the information such as the speed, acceleration, and planned traveling route of the mobile shop vehicle 100. The vehicle information server 400 stores the vehicle information, received from the mobile shop vehicle 100, with the vehicle identifier associated with it. The vehicle identifier and the shop identifier may be the same, or the correspondence between the vehicle identifier and the shop identifier may be stored in advance.

When the mobile shop vehicle 100 sends the shop information to the server device 200, only the shop information is sent the with the shop identifier (vehicle identifier) associated with it (S502). Upon receiving the shop information, the server device 200 acquires the location information and the direction information on the mobile shop vehicle 100 from the vehicle information server 400 (S503). The server device 200 uses the shop identifier (vehicle identifier) as the key to request the vehicle information server 400 to send the location information and the direction information. The mobile shop vehicle 100 may give, in advance, the vehicle information server 400 a permission for the server device 200 to access the vehicle information. Alternatively, the mobile shop vehicle 100 may send the authentication information for the server device 200 to access the vehicle information server 400, as well as the shop information, to the server device 200.

The shop guidance map generation and output processing (S504), performed by the server device 200 after acquiring the shop information and the location information, is the same as the corresponding processing in the first embodiment and, therefore, its description is omitted.

This embodiment provides the effect similar to that in the first embodiment. The mobile shop vehicle 100, which is a vehicle, may be configured to periodically send the vehicle information to the server 400. In such a case, the method according to this embodiment eliminates the need for the mobile shop vehicle 100 to send the information, such as the location information and the direction information, to a plurality of servers, thus reducing the communication.

Third Embodiment

In the first embodiment, the location information sent from the mobile shop vehicle 100 includes the latitude and longitude information (hereinafter referred to as the GPS location information) acquired by the GPS device. In this embodiment, instead of or in addition to the GPS location information, the relative location relationship to the surrounding objects, which the mobile shop vehicle 100 can obtain from the sensors and cameras, is used to generate a shop guidance map. Note that the information indicating the relative location relationship to the surrounding objects is one example of the location information indicating the location of the mobile shop vehicle 100.

Figure 6:
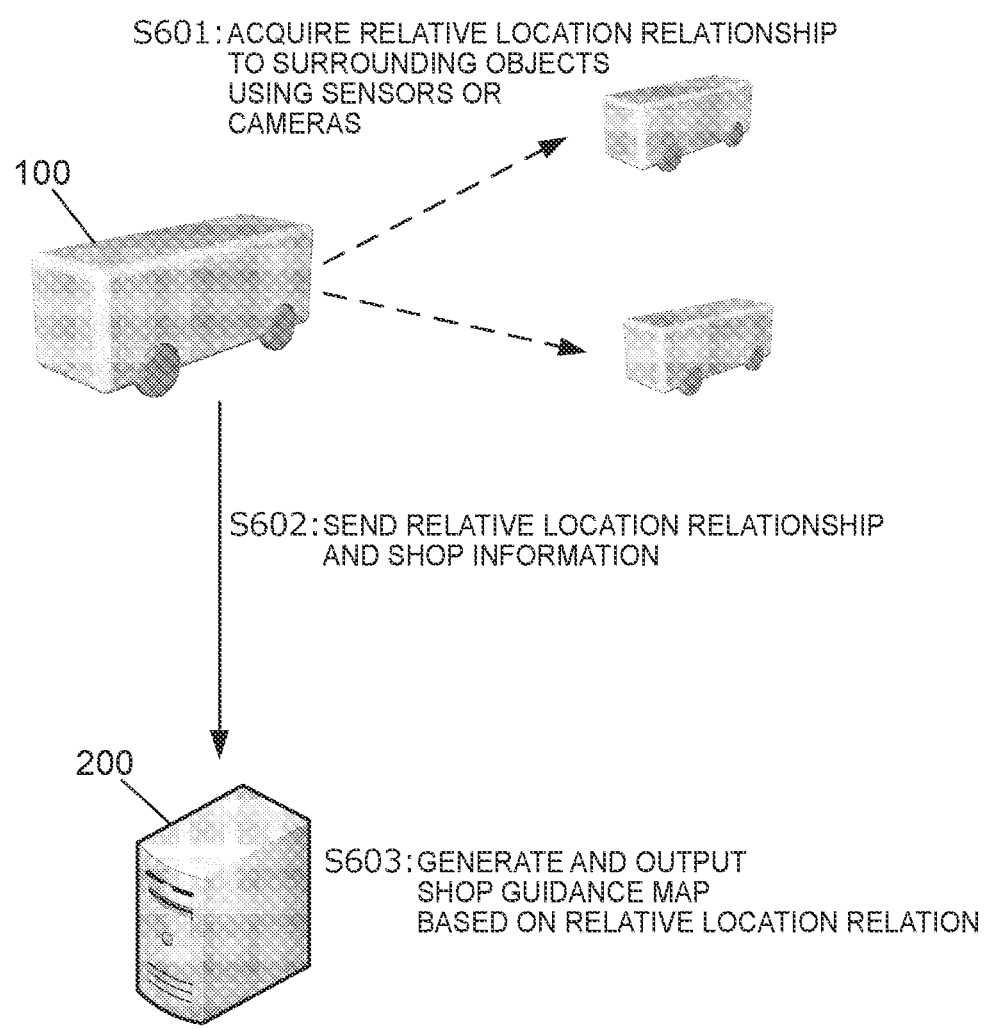
FIG. 6 is a diagram showing a configuration and a processing outline of a shop guidance information providing system according to a third embodiment.

FIG. 6 is a diagram showing a configuration and a processing outline of the shop guidance information providing system according to this embodiment. In this embodiment, the mobile shop vehicle 100 photographs and senses the surrounding situations using the camera 107 and the sensor 101 and, based on the result, acquires the relative location relationship to the surrounding objects (S601). For example, the mobile shop vehicle 100 can know that there is another mobile shop vehicle at a distance of L meters away from, and in the direction of θ degrees to, the mobile shop vehicle 100. Note that the surrounding objects include not only other mobile shop vehicles but also any object.

The mobile shop vehicle 100 sends the information, which is generated as described above to indicate the relative location relationship to the surrounding objects, as well as the shop information, to the server device 200 (S602). At this time, the mobile shop vehicle 100 may also send the GPS location information to the server device 200.

The server device 200 generates and outputs a shop guidance map based on the location information and the shop information acquired from the mobile shop vehicle 100 (S603). At this time, the layout of the mobile shop vehicles 100 can be generated from the information indicating the relative location relationship to the surrounding objects of the mobile shop vehicle 100. This is because, in generating the shop guidance map, the absolute location of each of the mobile shop vehicles 100 is not necessarily important but only the relative location relationship to each of the mobile shop vehicles 100 is sufficient for generating the shop guidance map. Furthermore, if the relative location relationship to a fixed object whose location is determined in advance is known, it is possible to accurately know the overall location of the mobile shop vehicles 100.

This embodiment also provides the effect similar to that in the first embodiment. In addition, since the relative location relationship detected by the cameras and sensors are more accurate than that indicated by the GPS location information, it is possible to generate a shop guidance map that shows the layout of the mobile shop vehicles 100 more accurately. Moreover, since a shop guidance map can be generated without using the GPS location information, a shop guidance map can be generated even in places and situations where the GPS location information cannot be acquired.

In this embodiment, the mobile shop vehicle 100 performs the analysis processing for acquiring the relative location relationship to the surrounding objects based on the information acquired from the cameras and the sensors. This analysis processing may also be performed by the server device 200 or other devices. In such a case, the mobile shop vehicle 100 sends the images, captured by the cameras, and the information, detected by the sensors, to the server device 200 or other devices. Note that this embodiment may be implemented in combination with the second embodiment.

Fourth Embodiment

In the first embodiment, a shop guidance map is generated using the current location information on the mobile shop vehicle 100. In this embodiment, a future shop guidance map is generated using the future location information (predicted location information) on the mobile shop vehicles 100. Note that this embodiment may be implemented in combination with the second or third embodiment.

In this embodiment, the mobile shop vehicle 100 acquires planned route information that indicates a future movement. The planned route information may be input to the mobile shop vehicle 100, for example, as a result of a route search that is performed by specifying a movement time. When the mobile shop vehicle 100 is a vehicle capable of autonomous driving, the planned route information may be input to the mobile shop vehicle 100 as a future movement command.

The information indicating a future movement may not necessarily be planned route information. The information indicating a future movement is only required to include at least one of the time of starting from the current location and the time of arrival at the destination.

The mobile shop vehicle 100 in this embodiment sends the shop information to the server device 200 with the information on a future movement included in the shop information. This allows the server device 200 to know the location of the mobile shop vehicle 100 at each future point in time. Therefore, the server device 200 can generate a shop guidance map indicating the layout of the mobile shop vehicles 100 at each future point in time based on the information on a future movement.

This embodiment generates not only a current shop guidance map but also a future shop guidance map, improving the user convenience.

Fifth Embodiment

In the embodiments described above, a shop guidance map is sent to the user terminal 300 or the output device 350 and displayed on these devices. In this embodiment, the server device 200 sends a shop guidance map to the mobile shop vehicle 100. The mobile shop vehicle 100 displays the shop guidance map on its display or provides the shop guidance map to the user terminal 300.

Figure 7:
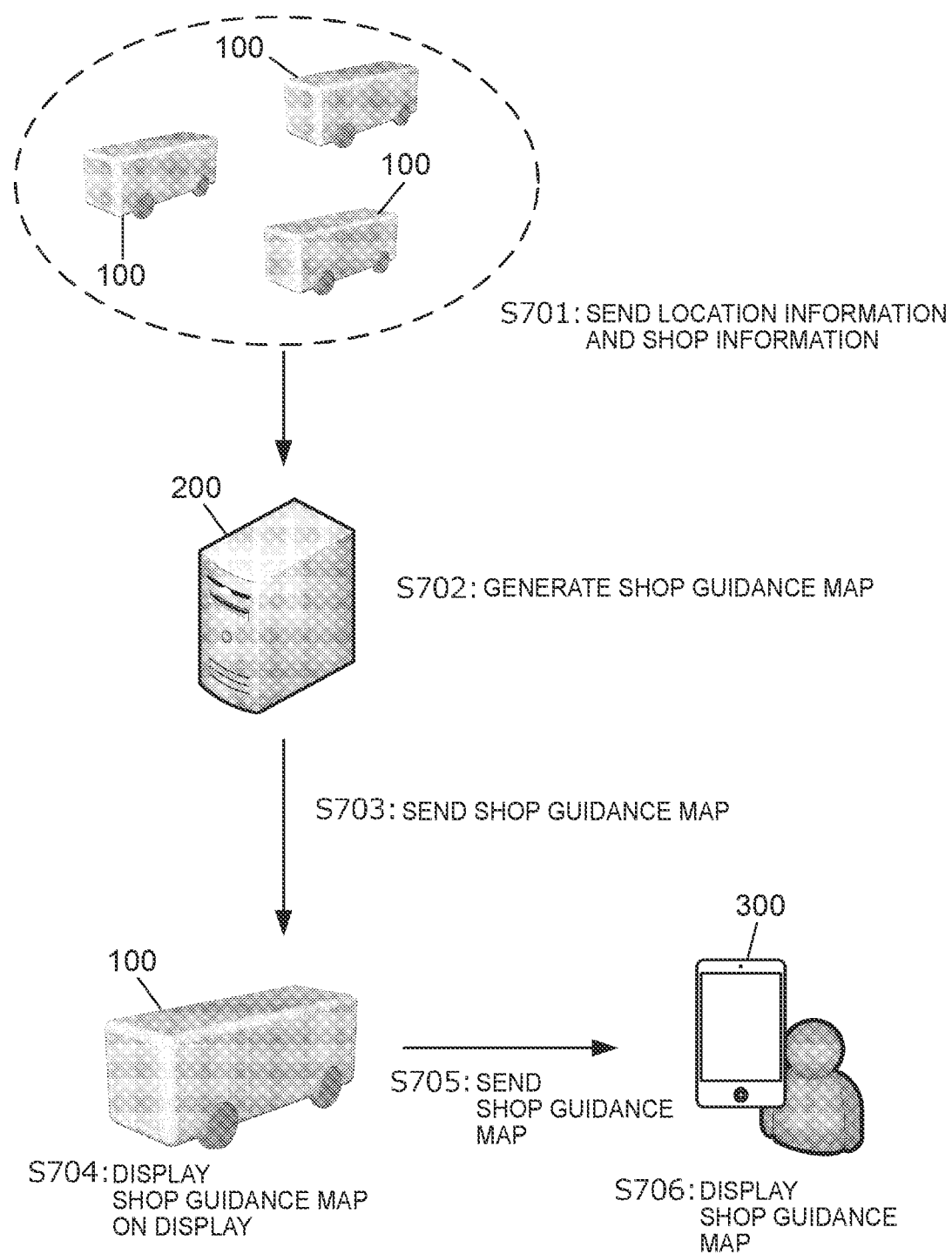
FIG. 7 is a diagram showing a configuration and a processing outline of a shop guidance information providing system according to a fifth embodiment.

FIG. 7 is a diagram showing a configuration and a processing outline of a shop guidance information providing system according to this embodiment. This embodiment is similar to the first embodiment in that the mobile shop vehicle 100 sends the location information and the shop information to the server device 200 (S701) and in that the server device 200 generates a shop guidance map (S702).

In this embodiment, the server device 200 sends the generated shop guidance map to the mobile shop vehicle 100 (S703). The mobile shop vehicle 100 displays the received shop guidance map on the display (S704). The control unit 109 of the mobile shop vehicle 100 functions as a receiving unit that receives the shop guidance map (map information) sent from the server device 200 and as a display control unit that displays the shop guidance map on the display (image output device). The display, on which the shop guidance map is displayed, may be a vehicular external display arranged outside the vehicle body or may be an in-vehicle display provided in the vehicle interior. Since the mobile shop vehicle 100 has an vehicular external display or an in-vehicle display, it is useful to provide the user with the shop guidance map via these devices.

The mobile shop vehicle 100 does not need to display the shop guidance map at all times. For example, the control unit 109 may be controlled in such a way that the control unit 109 and the user terminal 300 communicates via short-range wireless communication and that, only when a request is received from the user terminal 300, the shop guidance map is displayed on the display.

In addition, the mobile shop vehicle 100 may send (output) the shop guidance map to the user terminal 300 (S705). For example, the control unit 109 of the mobile shop vehicle 100 functions as an output unit that sends the shop guidance map to the user terminal 300 through short-range wireless communication in response to a request from the user terminal 300. The user terminal 300 displays the acquired shop guidance map on the display (S706).

OTHER EMBODIMENTS

Each of the above-described embodiments is merely an example. The present disclosure may be implemented by combining two or more embodiments or may be modified as appropriate without departing from the spirit thereof. For example, the processing described as being performed by one device may be performed by two or more devices. Furthermore, the processing described as being performed by separate devices may be performed by one device. In a computer system, it is possible to flexibly change the hardware configuration (server configuration) to implement each function.

What is claimed is:

1. A guidance information providing system comprising:
a plurality of mobile shop vehicles, each mobile shop vehicle of the mobile shop vehicles including first circuitry configured to acquire location information on the mobile shop vehicle and configured to send the location information on the mobile shop vehicle; and
a server device including second circuitry configured to acquire location information on the mobile shop vehicles collected in a space, configured to generate map information on a shopping mall including the mobile shop vehicles, the map information indicating a layout of the mobile shop vehicles in the shopping mall, and configured to output the map information,
wherein the location information on the mobile shop vehicle includes relative location information indicating a location of the mobile shop vehicle relative to a surrounding object.

2. The guidance information providing system according to claim 1 wherein
the first circuitry is configured to send shop information, the shop information including at least one of a name and a type of a shop of the mobile shop vehicle and
the second circuitry is configured to acquire the shop information and is configured to generate map information, the map information indicating the layout of the mobile shop vehicles and at least one of names and types of a plurality of shops, the plurality of shops including the shop.

3. The guidance information providing system according to claim 1 wherein
the first circuitry is configured to send an identifier of the mobile shop vehicle and
the second circuitry is configured to acquire shop information, the shop information including at least one of a name and a type of a shop of the mobile shop vehicle associated with the identifier of the mobile shop vehicle and is configured to generate map information, the map information indicating the layout of the mobile shop vehicles and at least one of names and types of a plurality of shops, the plurality of shops including the shop.

4. The guidance information providing system according to claim 2 wherein
the shop information includes at least one of inventory information on goods, selling price information, and opening hours information.

5. The guidance information providing system according to claim 2 wherein
the shop information includes information on a future movement of the mobile shop vehicle and
the second circuitry is configured to generate map information indicating a future layout of the mobile shop vehicles based on the information on the future movement of the mobile shop vehicle included in the shop information.

6. The guidance information providing system according to claim 1 wherein the first circuitry is configured to periodically send the location information on the mobile shop vehicle to an external server with the location information on the mobile shop vehicle associated with an identifier of the mobile shop vehicle and
the second circuitry is configured to acquire from the external server the location information on the mobile shop vehicle with which the identifier of the mobile shop vehicle is associated.

7. The guidance information providing system according to claim 1 wherein
the location information on the mobile shop vehicle includes latitude and longitude information obtained from a positioning device provided on the mobile shop vehicle.

8. The guidance information providing system according to claim 1 wherein
the relative location information includes a distance from the mobile shop vehicle to the surrounding object and information about a direction from the mobile shop vehicle to the surrounding object.

9. The guidance information providing system according to claim 1 wherein
the second circuitry is configured to output the map information to an image display device.

10. The guidance information providing system according to claim 1 wherein
the second circuitry is configured to output the map information to a mobile terminal of a user.

11. The guidance information providing system according to claim 1 wherein
the second circuitry is configured to output the map information to the mobile shop vehicle and
the first circuitry is configured to receive the map information and to output the map information to a mobile terminal of a user.

12. A guidance information providing device comprising circuitry configured to acquire location information on mobile shop vehicles collected in a space, configured to generate map information on a shopping mall including the mobile shop vehicles, the map information indicating a layout of the mobile shop vehicles in the shopping mall, and configured to output the map information,
wherein the location information on the mobile shop vehicle includes relative location information indicating a location of the mobile shop vehicle relative to a surrounding object.

13. The guidance information providing device according to claim 12 wherein
the circuitry is configured to acquire shop information, the shop information including at least one of a name and a type of a shop of the mobile shop vehicle and is configured to generate map information, the map information indicating the layout of the mobile shop vehicles and at least one of names and types of a plurality of shops, the plurality of shops including the shop.

14. The guidance information providing device according to claim 13 wherein
the shop information includes additional information that includes at least one of inventory information on goods, selling price information, and opening hours information and
the circuitry is configured to output the additional information associated with the map information.

15. The guidance information providing device according to claim 13 wherein the shop information includes information on a future movement of the mobile shop vehicle and the circuitry is configured to generate map information indicating a future layout of the mobile shop vehicles based on the information on the future movement of the mobile shop vehicle included in the shop information.

16. The guidance information providing device according to claim 12 wherein the circuitry is configured to acquire an identifier of the mobile shop vehicle from the mobile shop vehicle and is configured to acquire location information associated with the identifier from an external server in which the location information sent from the mobile shop vehicle is stored.

17. The guidance information providing device according to claim 12 wherein the location information includes latitude and longitude information obtained from a positioning device provided on the mobile shop vehicle.

18. The guidance information providing device according to claim 12, wherein the relative location information includes a distance from the mobile shop vehicle to the surrounding object and information about a direction from the mobile shop vehicle to the surrounding object.

19. A guidance information providing method comprising:

acquiring, by a computer, location information on mobile shop vehicles collected in a space;

generating, by the computer, map information on a shopping mall including the mobile shop vehicles, the map information indicating a layout of the mobile shop vehicles in the shopping mall; and outputting, by the computer, the map information, wherein the location information on the mobile shop vehicle includes relative location information indicating a location of the mobile shop vehicle relative to a surrounding object.

20. A non-transitory storage medium storing a program, wherein the program, when executed by the computer, causes the computer to execute the guidance information providing method according to claim 19.

* * * * *